RE 25297
June 13, 1961 B. R. GARRETT 2,988,247
COMBINED HOPPER, FEEDER AND COUNTER
Filed July 10, 1956 3 Sheets-Sheet 1
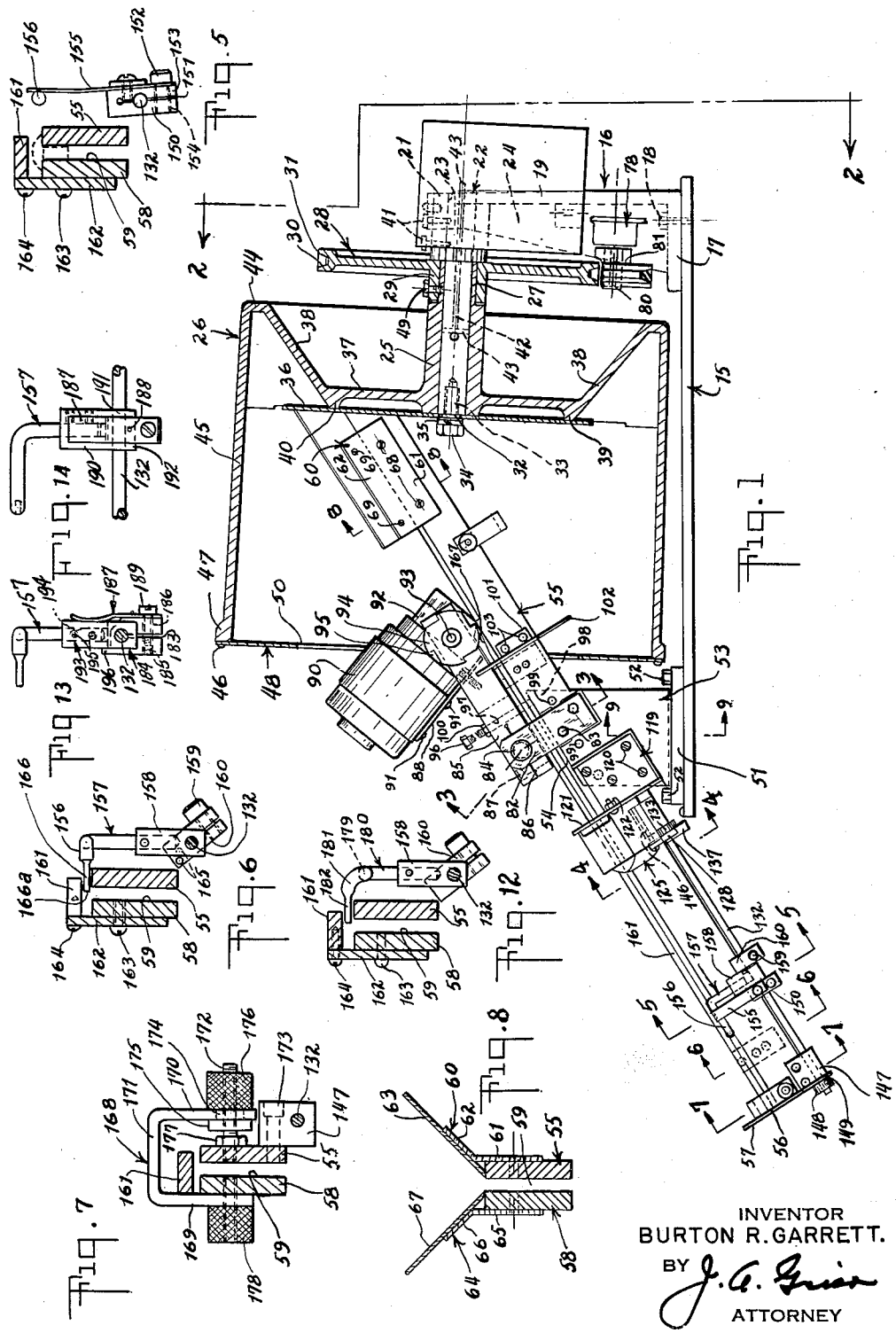
INVENTOR
BURTON R. GARRETT.
BY
ATTORNEY

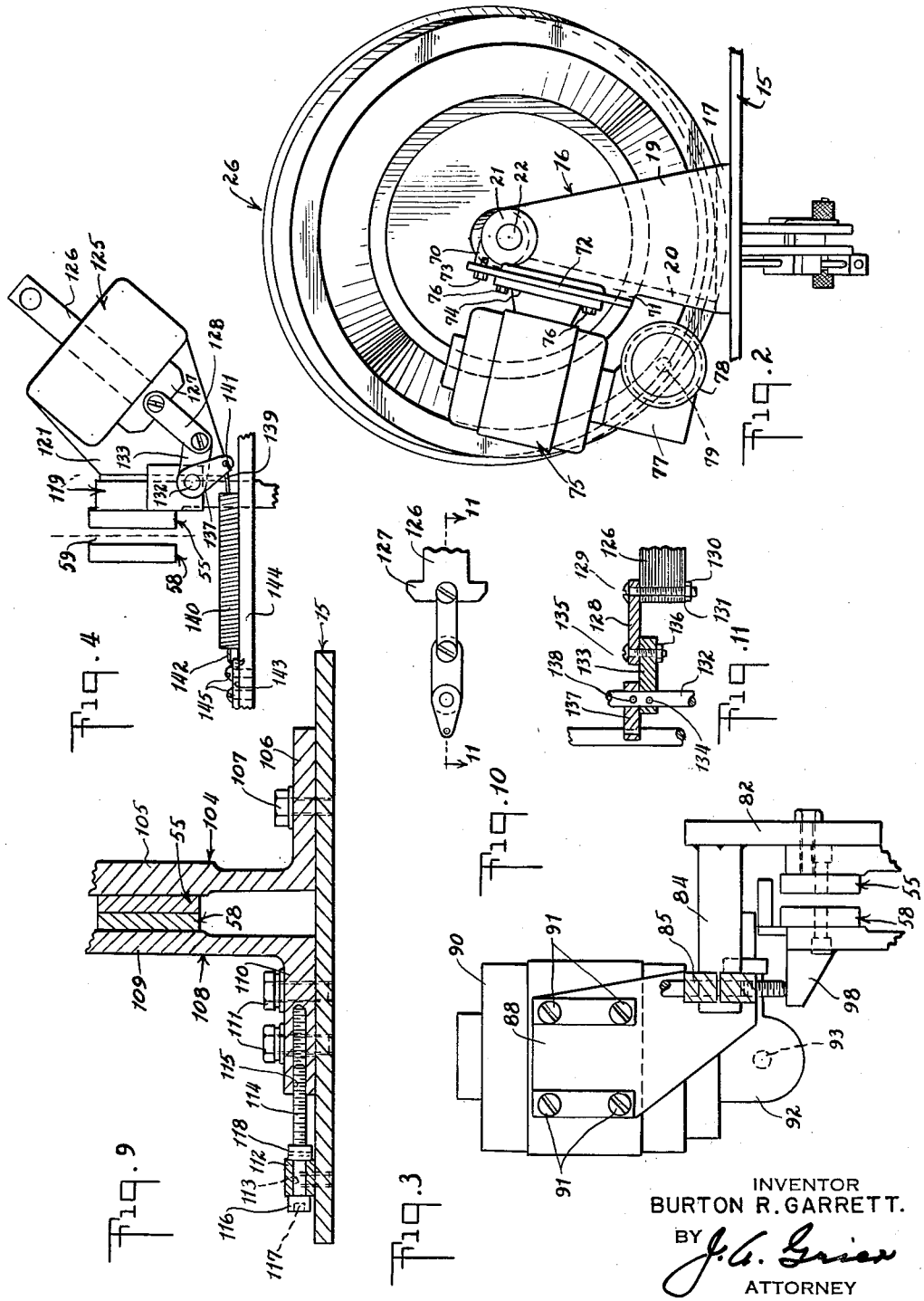

INVENTOR.
BURTON R. GARRETT
BY
ATTORNEYS

United States Patent Office 2,988,247
Patented June 13, 1961

2,988,247
COMBINED HOPPER, FEEDER AND COUNTER
Burton R. Garrett, Bayside, N.Y. (U.S. Engineering Co., 40—24 22nd St., Long Island City 1, N.Y.)
Filed July 10, 1956, Ser. No. 596,976
8 Claims. (Cl. 221—162)

This invention relates to improvements in counters and has for an object the provision of a miniature barrel with interior pockets therein adapted to trap articles and to deliver them on to the upper end of an inclined chute, means to orientate the articles in the chute and those articles which fail to orientate fall to the bottom of the barrel where they are again picked up, motor-driven means to rotate the barrel, other motor-driven means to orientate some of the articles and to knock off those which are not far enough into said chute, the latter being delivered back into the barrel or hopper so that they may be recirculated, and settable solenoid means to control the release of counted articles from said chute.

Another object of the invention is the provision of a device of the character described wherein the width of the chute may be adjusted by moving one rail toward or away from another for larger or smaller articles.

Other objects and advantages of the invention will be apparent to those skilled in the art, upon a study of this specification and the accompanying drawings.

Referring to the drawings which are given by way of example to teach others how to practice the invention:

FIGURE 1 is a side elevation of the device, with certain parts thereof shown in cross-section;

FIGURE 2 is a rear elevation of the device taken along the line 2—2 of FIGURE 1;

FIGURE 3 is an elevational view taken along the line 3—3 of FIGURE 1;

FIGURE 4 is an elevation, taken along the line 4—4 of FIGURE 1;

FIGURE 5 is an elevation taken along the line 5—5 of FIGURE 1;

FIGURE 6 is an elevational view taken along the line 6—6 of FIGURE 1, showing the article release finger;

FIGURE 7 is an elevational view taken along the line 7—7 of FIGURE 1;

FIGURE 8 is an elevational view taken along the line 8—8 of FIGURE 1, within the barrel or hopper;

FIGURE 9 is an elevational view partly in section and taken along the line 9—9 of FIGURE 1;

FIGURE 10 is a view of a portion of a solenoid plunger and the linkages connected thereto for effecting the release of groups of articles from the end of the chute;

FIGURE 11 is a sectional view taken along the line 11—11 of FIGURE 10;

FIGURE 12 is a view of a modified form of the article release finger;

FIGURE 13 is a side elevation of a modified form of the support for the article release finger; and FIGURE 14 is a side elevation of the support shown in FIGURE 13;

Figure 15:
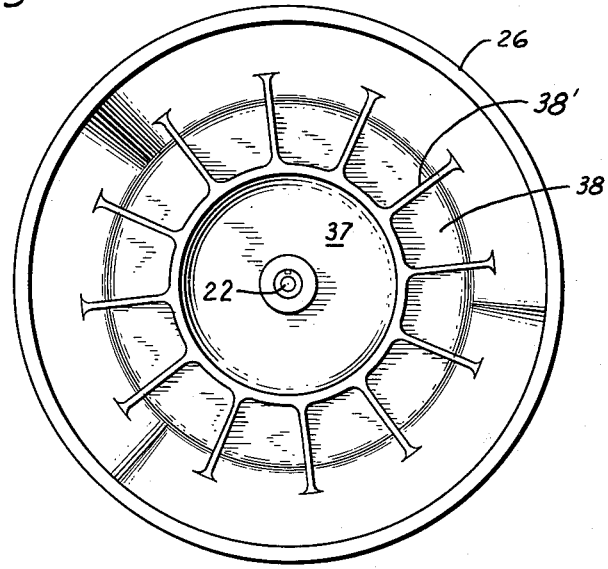
FIG. 15 is a front view of the barrel with the cam plate removed.
Figure 16:
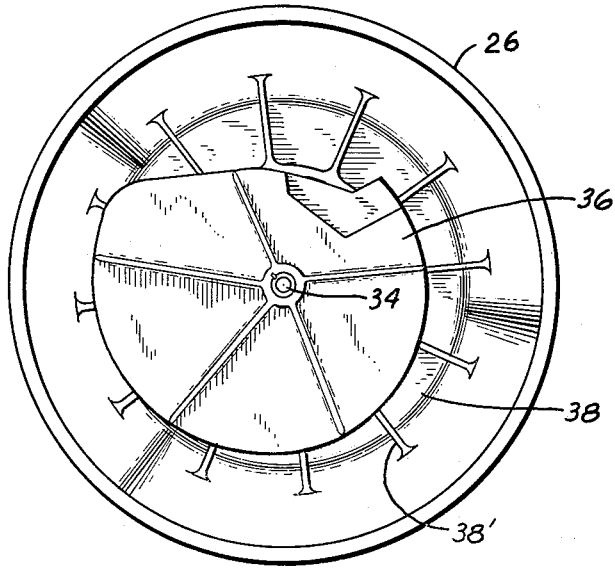
FIG. 16 is a view similar to FIG. 15 with the cam plate in position.

Referring first to FIGURE 1, a main base plate 15 has an upright standard 16 with a base 17 secured to said main plate 15 by means of screws, one of which is shown at 18. Extending upwardly from the base 17 is a web 19 which is somewhat triangular in form and it carries on its upper end a boss 21 which has a hole 23 formed therein. Mounted in the hole 23 is a shaft 22 which will presently be described. Between the base 17 and the boss 21 is a web 24 for lending rigidity to the standard.

The standard 16 is secured on the main base plate 15 by means of cap screws, one of which is shown at 18. The shaft 22 has a portion which is mounted in the hole 23 in the boss 21 and this shaft extends to the left of the boss 21, as seen in FIGURE 1, and forms a support for the hub 25 of the barrel 26. The hub 25 of the barrel has a portion 27 of reduced diameter, and a pulley 28 has a hub 29 with an interior bore which forms a press fit on the reduced portion 27 of the hub 25 above referred to. The pulley 28 has an annular groove 30 which accommodates a so-called V belt 31 and this pulley 28 is driven by means of a prime mover, to be presently described. The shaft 22 has a squared portion 32 on the left end thereof and also the shaft has a threaded hole 33 to accommodate a cap screw 34. A separation plate 36 has a square hole in its center which forms a fit on the squared end 32 of the shaft 22 and the cap screw 34, together with a lock washer 35, cooperates with the threaded hole 33 to retain the plate 36 in position and to hold it against rotation. In other words, the shaft 22 and the plate 36 are held against rotation while the barrel 26 per se is rotated in unison with the pulley 28. The hub 29 of the pulley 28, in addition to being forced on to the reduced portion 27 of the hub 25, is keyed together by any suitable means, such as a screw 49.

Formed integral with the hub 25 of the barrel is a disc-like portion 37 which together with an angular web portion 38 of the barrel forms apexes 39 and 40, which are points on the continuous annular surface forming the machined end of web 38, against which the plate 36 bears when the screw 34 is engaged with the threaded hole and screwed up tight against the lock washer 35.

The shaft 22 is secured in the hole 23 in the boss 21 by means of set screws 41 and is consequently held against rotation thereby. Extending axially into a shaft from the right end thereof, as seen in FIGURE 1, is a grease passage 42 and this grease passage communicates with a cross-passage 43 also formed in the shaft 22. Carried in the right end of the shaft 22, as seen in FIGURE 1, is a grease fitting 43 through which lubricating means is supplied to the bearing surfaces of the shaft 22.

The angular web portion 38 of the barrel is formed integral with radial portions 44 of the barrel and these in turn are formed integral with the annular peripheral wall 45 of the barrel.

The barrel has secured to the open end thereof by means of screws 46 engaging bosses 47, an annulus 48 which has an interior hole 50 formed therein and this annulus forms a partial closure for the open end of the barrel 26 and clears other elements which will presently be described. Mounted on the main base plate 15 adjacent to the open end of the barrel 26 is a base element 51 which is rigidly secured to the main base plate 15 by means of cap screws 52. Extending upwardly from the base element 51 is an upright support 53 which has its upper end 54 angular. Supported on the upright support 53 is a bar 55 which extends from a point adjacent to the face of the separation plate 36 to a point adjacent to the discharge end of the device. This means, then, that the rail element 55 abuts a plate 57 at the point indicated by the numeral 56. Spaced apart from the rail element 55 and parallel therewith is a second rail element 58 and a space 59 therebetween is provided to clear depending portions of articles passing down said rails (see FIG. 8 also). An angular plate 60 has a portion 61 which is secured to and abuts the outer edge of the rail 55 and which has an angular portion 62 to which a rectangular plate 63 is secured. The plate 63 has its lower edge beveled to contact the upper surface of the rail 55. A similar angular plate 64 has a vertical portion 65 which is secured to the outer face of the rail 58 and the upper or angular portion 66 thereof is secured to a plate member 67 and the lower edge of said plate is beveled so that it fits on top of the upper end of the rail 58.

In FIGURE 1, an elevation of the plate 60 may be seen, as well as the angular portions 61 and 62, and screws 68 which secure the angular plate 60 to the rail 55. Also is shown screws 69 which secure the angular portion 62 of the angular plate 60 to the rectangular portion 63.

Referring now to FIGURE 2, it will be noted that the standard 16 above described has a boss 70 formed integral with the boss 21, and spaced apart from the boss 70 is a similar boss 71. The bosses 70 and 71 form pads upon which a mounting plate 72 is to be mounted. This mounting plate is secured to the bosses 70 and 71 by means of cap screws, one of which is shown at 73.

A motor 75 has a base 74 which is secured to the plate 72 by means of cap screws 76. The motor 75 has the usual shaft and carries a reduction gear housing 77 which has a circular portion 78 which houses a reduction shaft 79 and this shaft has a portion 80 (as best seen in FIGURE 1) which extends through a small grooved pulley 81 and this pulley is belted to the pulley 28. When the motor 75 is energized the barrel 26 is rotated, due to the gear reduction within 77 and 78 and further due to the fact that the grooved pulley 81 is small in diameter and the grooved pulley 28 is large in diameter.

The upright support 53 has secured thereto by means of screws 83 a rigid bar 82. This bar has formed integral therewith a shaft 84. A supporting bar 85 has a lateral hole therein to accommodate the shaft 84, and this supporting bar has a slot 86 formed therein, and extending into the bar 85 from above is a clamping screw 87 by means of which the support 85 may be rigidly clamped to the shaft 84. The supporting bar also has rigidly secured thereto a plate member 88 which forms a support for an electric motor 90. The motor is secured to the base 89 by means of screws 91. The motor has a gear reduction 92, and a shaft 93 extending therefrom carries a disc 94 which has a series of notches 95 formed therein. The disc member 94 is positioned adjacent to the upper surfaces of the rails 55 and 58 and rotates counter to the direction of movement of articles down said rails. For example, in FIGURE 1 it will be noted that the element 94 rotates counter-clockwise. The supporting bar has a threaded hole 97 formed therein and engaging said threaded hole is a cap screw 96, the lower end of which engages an anvil member 98 which is secured to the rail 58 by means of screws 99. The cap screw 96 carries a lock nut 100 and it functions as an adjustment for setting the disc member 94 a desired distance above the rails 55 and 58. As the cap screw 96 is rotated, the lock nut having previously been loosened, the lower end of the cap screw bears against the anvil 98 and thereby the relation of the disc 94 and the upper surfaces of the rails may be adjusted. The lock nut 100 functions to retain any desired adjustment.

Mounted on the rail 55 is a plate 102 which has an angular tab 101 formed integral therewith and this tab is secured to the rail by means of screws 103 and this plate functions to prevent articles which have run awry and which have been knocked off of the rails by the element 94, from falling outside of the barrel 26, and insures their return to the interior of the barrel 26 and recirculation therein.

FIGURE 9 shows the rail 55 secured to a support 104 having a vertical portion 105 and a horizontal or base portion 106 and this horizontal portion is secured to a main base plate 15 by means of cap screws, one of which is shown at 107. The rail 58 is secured to a supporting bracket 108 which has a vertical portion 109 in contact with the rail 58 and a horizontal or base portion 110 which is in contact with the main base plate 15 and is secured thereto by means of cap screws 111. Spaced apart from the base portion 110 is a bar 112 which has a clearance hole 113 therein. A shaft 114 has the greater portion of its length threaded and engaging a threaded hole 115 in the base portion 110 so that any rotation of the shaft 114 will cause the base 110 to move to the right or to the left, as seen in FIGURE 9. The shaft 114 has a head portion 116 which is socketed at 117 to accommodate an Allen socket. This head bears against the left end of the bar 112, as seen in FIGURE 9. On the other side of the bar 112, a pair of locked nuts 118 provide a shoulder. Now, it can be seen that when the cap screws 111 are loosened, any one can turn the shaft 114 by means of an Allen wrench engaging the socket 117 in either direction and thus the space between the rails 55 and 58 may be adjusted, following which such adjustment may be retained by tightening the cap screws 111.

From the above it can be readily seen that the space between the rails 55 and 58 may be easily adjusted for any type of article to travel down the rails and may even have a portion extending downwardly between the rails.

Referring now to FIGURES 1 and 4, a support plate 119 is secured upon the upright support 53 by means of screws 120 and a plate member 121 is secured to said support in any suitable manner as, for example, by means of screws 122. Mounted on the plate 121 is a solenoid 125. This solenoid has a plunger 126 which has a head 127 on the lower end thereof and this plunger is pivotally connected to a link member 128 by means of a screw 129 threaded into 126 and locked by means of nut 130 with a washer 131 therebetween. A shaft 132 extending parallel to the rail 55 and which will be presently described has a crank arm 133 connected thereto by means of a taper pin 134, or in any other suitable manner, and this crank arm is connected to the link 128 by means of a screw 135 which passes through aligned holes in the link 128 and is threaded into the crank arm 133, the larger hole being in the link and fixed therein by means of a nut 136 on the lower end thereof. Also connected to the shaft 132 is an arm 137 which is keyed to the shaft 132 by means of a taper pin 138 or in any other suitable manner, and a spring 140 has one end 139 connected to a hole 141 formed in the arm 137. The other end 142 is connected to a hole formed in a lug 143 and this lug is in turn secured to a support 144 by means of screws 145.

In FIGURE 4, the plunger 126 is shown in an actuated position with the head 127 against the winding. The link 128 has swung the crank 133 in a counter-clockwise direction so that the shaft 132 is also moved in the counter-clockwise direction and an article-separating element, to presently be described, has functioned. In FIGURE 4, it will be noted that the rails 55 and 58 are set with a space 59 therebetween for the passage of articles down the incline.

The shaft 132 is journaled in a bearing block 146 adjacent to the solenoid and in a bearing block 147 adjacent to the outer extremity and the shaft 132 carries on its lower end a collar 148 which is secured thereon by means of a set screw 149 or in any other suitable manner.

Referring now to FIGURE 5, the shaft 132 carries a metallic block 150 which carries a hole adapted to accommodate the shaft 132 and this block has a slot 151 formed therein extending upwardly beyond the shaft 132, and a screw 152 passes through a clearance hole 153 in the block 150 and into threaded hole 154 beyond the slot 151. Secured to the block 150 is a leaf spring 155 the upper end of which bears against the horizontal portion 156 of an article separator element 157. The element 157 is socketed in a block member 158 which straddles the shaft 132 and is movable with the block members 150 and 160 and is therefore resiliently or floatingly carried on the shaft 132. The spring 155, as will be seen in FIGURE 1, bears against the horizontal portion 156 and urges the element 157 toward the row of articles carried by the rails 55 and 58. Beyond the block member 158 on the shaft 132 is a third block member 160 which carries a set screw 159 for clamping it on to said shaft.

Releasing element 57 is keyed on the end of the shaft 132 and is normally positioned at the lower end of the rails to hold back articles on the rails. The separating element is also carried on the shaft 132 and it includes an element 157, the extremity of which enters between articles on the rails and may be set along the shaft 132 so that a required number of articles are separated from the rest of the group.

Shaft 132 is rotated through an arc by means of the solenoid 125 as may be clearly seen in FIGURES 1 and 4 and due to the fact that it is resiliently mounted, the spring 155 which bears against the element 157 allows the shaft 132 to rotate further and move the shutter 57 to a point where the separated articles may slide off the rails.

Secured to the rail 58 from a point adjacent to the metallic disc 94 to the lower end of the device is a guard rail 161 which is supported by a metallic strip 162 which is secured to the rail 58 by means of screws, one of which is shown at 163. The guard rail 161 is mounted on the metallic strip 162 by means of screws, one of which is shown at 164. The strip 162 is adjustable vertically to accommodate the heads or protruded ends of articles of great varieties. Adjustment may be made by loosening the screws 163 and raising or lowering the strip 162 until the space between the guard rails 161 and the upper surfaces of the rails 55 and 58 is sufficient to accommodate the protruding portions of the articles to be counted.

In FIGURE 6, the block 158 into which the element 157 is socketed may be clearly seen. In this figure, the block 160 carried on the shaft 132 may be clearly seen. It will be noted that the block carries a cap screw 159 by means of which this block may be secured on the shaft 132. The block 160 also carries holes 165 to accommodate pins which may be spaced through the block 160 into corresponding holes in the block 158. The upper end 156 of the element 157 may be clearly seen in FIGURE 6 and it will be noted that the left end 166 may be reduced in thickness and that it may have a point 166a on its extremity to form an entering wedge between articles in a row in the space 59 each time the solenoid 125 is energized to separate a group containing a predetermined number of articles in the chute from the others in the chute between the element 157 and the plate members 63 and 67.

The upper extremity of the guard rail 161 is beveled at 167 to clear the disc 94, and allow it to function to knock backwards those articles which were not orientated in the space 59 between the rails 55 and 58 which otherwise would not pass under the guard rail 161.

Referring now to FIGURE 7 and the left extremity of the device, as seen in FIGURE 1, a generally U-shaped member 168 is inverted and it has a leg 169 secured to the rail 58 and a second vertical leg 170 spaced apart from the rail 55 and these two vertical legs are joined by the horizontal portion 171. The portions 169 and 170 have aligned holes therethrough and the rails 55 and 58 have holes therethrough coinciding with the aligned holes above referred to. The hole in the portion 170 is substantially larger than the hole in the portion 169, and set into this hole is a stepped bushing 174 having a head 175 and a knurled portion 176. This bushing has an internally threaded hole therethrough and within said threaded hole is a screw 172 which may be rotated by a knurled portion 176. The shank of the bushing 174 is substantially longer than the thickness of the leg 170, and the knurled portion 176 is integral with the head 175 and the portion 174. The screw also engages threads in the rail 55. A lock nut 177 on the screw bears against the rail 55 and locks to retain any adjustment of the rail 55 relative to the rail 58. The hole in portion 174 meets a lateral slot in the portion 174.

The function of nut 177 is to lock stud 172 into rail 55, and it is not loosened when adjustment is made. Since yoke 168 rides in groove 174 of nut 176 of which 175 is the opposite shoulder, turning nut 176 causes the space between rails 55 and 58 to be adjusted. This adjustment is adapted to compensate for spring or warp in the rails, and it is capable of providing fine adjustment of the rails.

Referring now to FIGURE 12, a modification of the article separating element is shown. The support 158 for the same is identical with the one previously described and the rails and other elements are identical to those shown in FIGURE 6. The article separating element 180 has a vertical shank portion, a horizontal portion 179 and an upper portion 181. The upper portion 181 has an extremity 182 which has been reduced in thickness so that it may freely enter between the articles for separating the articles into groups containing the same number of articles.

Referring now to FIGURES 13 and 14, a modified form of the support for the article separating element is shown. This support is comprised of a body member 184 which has a hole therethrough forming a working fit on the shaft 132. The lower portion of the body 184 up to said hole is bifurcated by means of a slot 183 which extends from the bottom thereof, as seen in FIGURE 13, to said hole.

A cross hole is formed in the lower portion of the body 184, to the left of the slot 183 this cross hole is provided with threads 185, while to the right of the slot the hole is a clearance hole 186. A leaf spring 187 carries a hole which accommodates a dowel pin 188 in the body 184 and adjacent to this hole is a clearance hole which accommodates a screw 189, the dowel pin 188 serving to prevent the spring 187 to turn on the screw thus holding it upright at all times.

A second body 190 has depending portions 191 and 192 carrying holes to accommodate the shaft 132 and has an upper socket portion 193 with a socket hole 194 therein to accommodate an article separating element such as that shown at 157 in FIGURE 6, set screws 195 being provided for securing the separating element therein. The spring 187 bears against the socket portion of the body 193 and urges it to the left, as seen in FIGURE 13, and thereby maintains it in contact with a stop element 196 which forms an integral part of the body 184. This device may be quickly set in any desired position along the shaft 132 by loosening the screw 189, moving the device to the desired position and then retightening the screw 189.

Although I have herein shown and secured by way of example, a preferred embodiment of the invention and several modifications of some of the elements thereof, it will be understood that I am not to be limited to the exact details since many more arrangements may be made, shown and described in the following claims.

I claim:

1. A feeding apparatus for various articles having a barrel rotatable on a substantially horizontal axis and open on one end, a pair of rails for discharging a plurality of said articles from said barrel, said rails being inclined downwardly from inside said barrel, a feeding wheel in the closed rear end of and integral with said barrel for lifting articles from the lower portion thereof and depositing them on said rails, a plurality of transverse substantially radial vanes on said wheel adapted to scoop up and hold said articles in the upward travel of said barrel, a separation plate fixed on the front face of said wheel in contact with the front edges of said vanes to hold said articles from being discharged until they have reached the upper part of said rails.

2. A feeding apparatus according to claim 1 in which there is a shaft parallel to said rails at one side thereof, an arm on said shaft having a finger at such height as to enter above the space between said rails at a downward angle.

3. A feeding apparatus according to claim 2 in which said shaft extends along said rails and said arm is adjustable along said shaft along substantially its entire length.

4. A feeding apparatus according to claim 1 in which one of said rails is fixed and means are provided for varying the distance between said rails to accommodate articles of various sizes.

5. A feeding apparatus according to claim 1 in which one of said rails is fixed and means are provided for varying the distance between said rails to accommodate articles of various sizes, said means being located at opposite ends of said pair of rails.

6. A feeding apparatus according to claim 1 in which there is a rejection device for improperly alined articles, said device comprising at least one disk adjacent to and above the upper end of said rails, said disk having notches therein, said notches facing said wheel, and means for rotating said disk counter to the direction of movement of said articles down said rails.

7. A feeding apparatus according to claim 1 in which said plate has a cam edge tapering from adjacent the wall of said barrel to a point adjacent to the inner edge of said vanes.

8. A feeding apparatus according to claim 1 in which said wheel has a central disk and a frusto-conical rim extending from the periphery of said disk to the rear of said barrel.

References Cited in the file of this patent

UNITED STATES PATENTS

| | | |
|---|---|---|
| 800,288 | Fulenwider | Sept. 26, 1905 |
| 841,471 | Vallentine | Jan. 15, 1907 |
| 1,372,255 | Stone | Mar. 22, 1921 |
| 1,779,866 | Wilcox | Oct. 28, 1930 |
| 2,284,698 | Trotter | June 2, 1942 |
| 2,531,099 | Anderson | Nov. 21, 1950 |
| 2,613,374 | Gora | Oct. 14, 1952 |
| 2,615,556 | Hoopes et al. | Oct. 28, 1952 |
| 2,776,073 | Schaeffer | Jan. 1, 1957 |